(12) United States Patent
Kim et al.

(10) Patent No.: US 10,903,468 B2
(45) Date of Patent: Jan. 26, 2021

(54) PLASMA GENERATING APPARATUS FOR SECONDARY BATTERY

(71) Applicant: LG Chem, Ltd., Seoul (KR)

(72) Inventors: Duck Hoe Kim, Daejeon (KR); Min Wook Kim, Daejeon (KR); Ju Hyeon Cho, Daejeon (KR); Cha Hun Ku, Daejeon (KR); Sang Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 47 days.

(21) Appl. No.: 16/352,016

(22) PCT Filed: Apr. 6, 2018

(86) PCT No.: PCT/KR2018/004102
§ 371 (c)(1),
(2) Date: Mar. 13, 2019

(87) PCT Pub. No.: WO2018/216900
PCT Pub. Date: Nov. 29, 2018

(65) Prior Publication Data
US 2020/0185680 A1 Jun. 11, 2020

(30) Foreign Application Priority Data
May 24, 2017 (KR) .......... 10-2017-0064271

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/168* (2013.01); *H01M 10/058* (2013.01); *H05H 1/24* (2013.01)

(58) Field of Classification Search
CPC .......... H01M 10/0404; H01M 10/04
See application file for complete search history.

(56) References Cited

U.S. PATENT DOCUMENTS

2009/0252893 A1* 10/2009 Ozaki ............... C23C 16/45595
427/579
2015/0140403 A1 5/2015 Moon et al.

FOREIGN PATENT DOCUMENTS

CN 101271269 A 9/2008
CN 101345295 A 1/2009
(Continued)

OTHER PUBLICATIONS

International Search Report for International Patent Application No. PCT/KR2018/004102, dated Jul. 12, 2018, 4 pages.

*Primary Examiner* — Olatunji A Godo
(74) *Attorney, Agent, or Firm* — Birch, Stewart, Kolasch & Birch, LLP (57) ABSTRACT

The present invention relates to a plasma generating apparatus for a secondary battery. The plasma generating apparatus for the secondary battery comprises a transfer roller that transfers a separator, a metal member disposed within the transfer roller, a plasma generating member that interacts with the metal member to generate a plasma and irradiate the generated plasma onto a surface of the separator, and a protrusion member that causes a portion of the separator closely attached to the transfer roller to protrude and forms an adhesion area, which is adhesive, and a non-adhesion area, which is non-adhesive or less adhesive than the adhesion area, by allowing the plasma to be irradiated onto the adhesion area and no plasma or less plasma to be irradiated onto the non-adhesion area.

18 Claims, 6 Drawing Sheets

(51) Int. Cl.
    *H01M 10/058*     (2010.01)
    *H05H 1/24*     (2006.01)

(56) References Cited

FOREIGN PATENT DOCUMENTS

| | | |
|---|---|---|
| CN | 104810495 A | 7/2015 |
| CN | 105051286 A | 11/2015 |
| CN | 205970036 U | 2/2017 |
| CN | 208284575 U | 12/2018 |
| JP | H1036535 A | 2/1998 |
| JP | H10172531 A | 6/1998 |
| JP | 10-309749 A | 11/1998 |
| JP | 2005-015841 A | 1/2005 |
| JP | 2006-079935 A | 3/2006 |
| JP | 2007-012668 A | 1/2007 |
| JP | 2007-261207 A | 10/2007 |
| JP | 2011-159434 A | 8/2011 |
| KR | 10-0958649 B1 | 5/2010 |
| KR | 10-2015-0057481 A | 5/2015 |
| KR | 10-2016-0028730 A | 3/2016 |
| KR | 10-2016-0121177 A | 10/2016 |

\* cited by examiner

PLASMA GENERATING APPARATUS FOR SECONDARY BATTERY

CROSS-REFERENCES TO RELATED APPLICATION

This application is a U.S. national phase application, pursuant to 35 U.S.C. § 371, of PCT/KR2018/004102, filed Apr. 6, 2018, designating the United States, which claims priority to Korean Application No. 10-2017-0064271, filed May 24, 2017. The entire contents of the aforementioned patent applications are incorporated herein by this reference.

TECHNICAL FIELD

The present invention relates to a plasma generating apparatus for a secondary battery, and more particularly, to a plasma generating apparatus for a secondary battery to achieve a patterned adhesion on a surface of a separator.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch that accommodates the electrode assembly and the electrolyte. In the electrode assembly, a positive electrode and a negative electrode are disposed with a separator therebetween. An electrode tab is attached to each of the positive electrode and the negative electrode, and an electrode lead is coupled to each of the electrode tabs.

A lamination process is performed on the secondary battery to improve adhesion of the electrode assembly in which the positive electrode, the separator, the negative electrode are laminated.

However, the secondary battery has a problem in which impregnation of the electrolyte is significantly reduced although the positive electrode, the separator, and the negative electrode are improved in bonding property through the lamination process. Particularly, a gas generated between the positive electrode and the separator or between the negative electrode and the separator is not smoothly discharged, and thus, it is difficult to secure uniform quality of the electrode assembly.

DISCLOSURE OF THE INVENTION

Technical Problem

The present invention has been made to solve the above-mentioned problems, and an object of the present invention is to provide a plasma generating apparatus for a secondary battery, which achieves a patterned adhesion on a surface of a separator to improve the adhesion between an electrode and the separator, impregnation of an electrolyte, and discharge of a gas.

Technical Solution

To solve the above-described object, a plasma generating apparatus for a secondary battery according to an embodiment of the present invention comprises a transfer roller that transfers a separator, a metal member disposed within the transfer roller, a plasma generating member that interacts with the metal member to generate a plasma and irradiate the generated plasma onto a surface of the separator, and a protrusion member that causes a portion of the separator closely attached to the transfer roller to protrude and forms an adhesion area, which is adhesive, and a non-adhesion area, which is non-adhesive or less adhesive than the adhesion area, by allowing the plasma to be irradiated onto the adhesion area and no plasma or less plasma to be irradiated onto the non-adhesion area.

The separator may have a bottom surface closely attached to the transfer roller, a top surface that is protruded by the protrusion member, and a connection surface that connects the bottom surface and the top surface. The plasma may be irradiated onto the bottom surface and the top surface to form the adhesion area that is adhesive, and to form the non-adhesion area that is non-adhesive or less adhesive than the adhesion area, on the non-adhesive area corresponding to the connection surface, due to the irradiated plasma being concentrated onto the top surface.

The protrusion member may have a ring shape along a circumferential surface of the transfer roller, and at least one protrusion may be provided in a longitudinal direction of the transfer roller.

The protrusion member having the ring shape may be provided to be moved and fixed to the transfer roller along the longitudinal direction of the transfer roller.

The protrusion member having the ring shape may be provided to be integrated with the transfer roller.

The protrusion member may be made of the same material as the transfer roller.

The bottom surface and the top surface may be provided as surfaces parallel to the longitudinal direction of the transfer roller, and the connection surface may be provided as a vertical surface perpendicular to the bottom surface and the top surface.

The plasma generating member may comprise a main body disposed in a width direction of the separator, and an electrode piece disposed in a longitudinal direction of the main body to generate the plasma between the metal member and the main body and thereby to irradiate the generated plasma onto the surface of the separator.

The plasma generating member may further comprise a switch that applies power to the electrode piece to generate the plasma.

The main body may be made of a non-metallic material. The main body may be made of a ceramic.

The electrode piece may be provided as a corona discharge electrode.

The electrode piece may be inserted into an insertion groove provided in an outer surface of the main body.

Advantageous Effects

First, the plasma generating apparatus for the secondary battery according to the present invention may comprise a transfer roller, a metal member, a plasma generating member, and a protrusion member. Thus, a patterned adhesion may be achieved on the surface of a separator, and the adhesion of the separator, the impregnation of the electrolyte, and the discharge of the gas may be improved.

Second, the protrusion member according to the present invention may have a ring shape that surrounds the circumferential surface of the transfer roller. Thus, a portion of the separator closely attached to the transfer roller may uniformly protrude, and thus, the adhesion having a particular pattern may be achieved on the surface of the separator.

Third, the protrusion member according to the present invention may move in the longitudinal direction of the transfer roller and be fixed. Thus, the patterned adhesion portion achieved on the surface of the separator may be adjusted in position, and the patterned adhesion of the surface of the separator may be uniform.

Fourth, the protrusion member may be made of the same material as the transfer roller. Thus, the manufacturing process may be simplified, and the manufacturing costs may be reduced.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Structure of Radical Unit

In a radical unit according to an embodiment of the present invention, an electrode and a separator are alternately disposed. Here, the electrode and the separator may be arranged in the same number or in different numbers.

Figure 1:
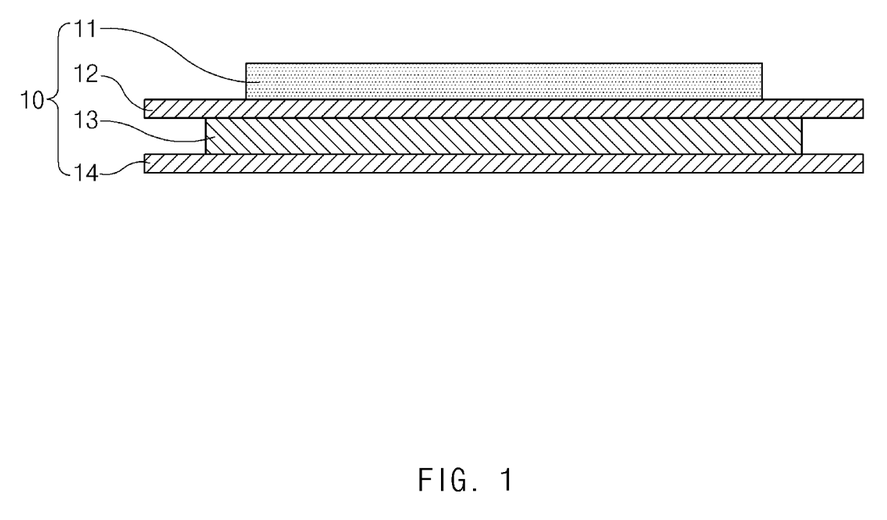
FIG. 1 is a cross-sectional view of a radical unit according to an embodiment of the present invention.

For example, as illustrated in FIG. 1, the radical unit 10 may be formed by successively laminating two electrodes 11 and 13 and two separators 12 and 14. Here, the two electrodes may be a positive electrode and a negative electrode, and the positive electrode and the negative electrode may face each other across the separator. Thus, the radical unit 10 has a structure in which the positive electrode, the separator, the negative electrode, and the separator are laminated.

Structure of Electrode Assembly

Figure 2:
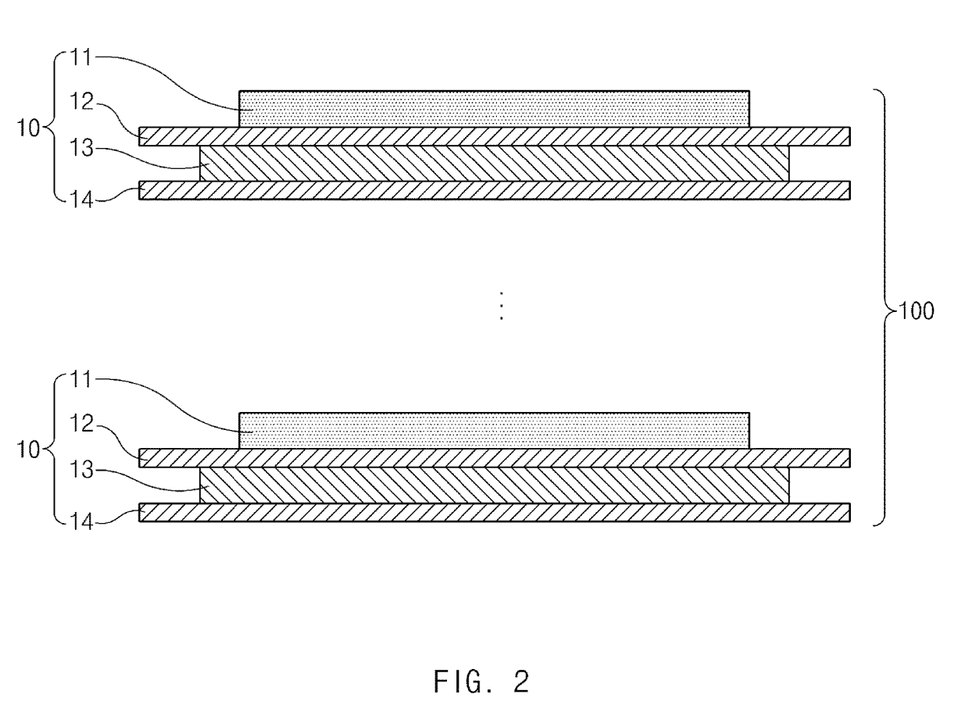
FIG. 2 is a cross-sectional view of an electrode assembly according to an embodiment of the present invention.

The electrode assembly 100 according to an embodiment of the present invention may be formed by repeatedly laminating one kind of radical unit 10 or two or more kinds of radical units 10 in a predetermined order.

For example, as illustrated in FIG. 2, a plurality of radical units 10 having the same lamination structure are laminated in a vertical direction. In other words, the electrode assembly 100 according to the first embodiment of the present invention may have a structure in which the radical unit 10 having a four-layered structure, in which the first electrode 11 that is the positive electrode, the separator 12, the second electrode 13 that is the negative electrode, and the separator 14 are successively laminated, is repeatedly laminated.

The radical unit 10 is manufactured using a lamination system. Here, the radical unit 10 may be improved in adhesion, electrolyte impregnation, and gas discharge due to the lamination system 200.

Lamination System

Figure 3:
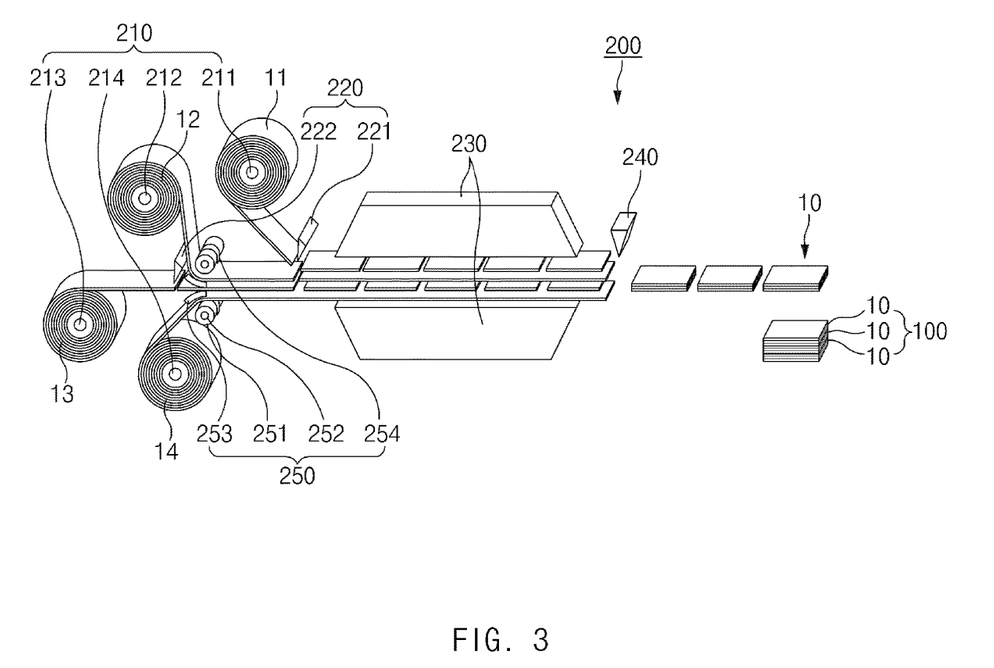
FIG. 3 is a view of a lamination system according to an embodiment of the present invention.

As illustrated in FIG. 3, a lamination system 200 according to an embodiment of the present invention may comprise a plurality of supply rollers 210 that supply the electrodes 11 and 13 and the separators 12 and 14 to be alternately laminated, a first cutter 220 that cuts the electrodes 11 and 13, a laminator 230 that thermally fuses the electrodes 11 and 13 and the separators 12 and 14 to manufacture a radical unit sheet, and a second cutter 240 that cuts the radical unit sheet to a predetermined size to manufacture a radical unit 10.

The plurality of supply rollers 210 comprises a first electrode supply roller 211 that supplies the first electrode that is the positive electrode, a second electrode supply roller 213 that supplies the second electrode that is the negative electrode, a first separator supply roller 212 that supplies one separator 12, and a second separator supply roller 214 that supplies another separator 14.

The first cutter 220 comprises a first cutter member 221 that cuts one electrode 11 to a predetermined size and a second cutter member 222 that cuts another electrode 13 to a predetermined size.

The laminator 230 applies heat to allow the electrodes 11 and 13 to adhere to the separators 12 and 14 while pressing the electrodes 11 and 13 and the separators 12 and 14.

The second cutter 240 cuts the separators 12 and 14 between the electrodes 11 and 13 that correspond to each other to manufacture the radical unit 10.

The lamination system 200 comprising the above-described constituents according to an embodiment of the present invention may manufacture the radical unit 10 in which the electrodes 11 and 13 and the separators 12 and 14 are alternately laminated. The plurality of radical units 10 may be laminated to manufacture an electrode assembly 100.

The lamination system 200 according to an embodiment of the present invention may comprise a plasma generating apparatus 250 to improve adhesion of the radical unit 10, electrolyte impregnation, and gas discharge. In particular, the plasma generating apparatus 250 activates adhesion that is uniform and patterned on the surface of the separator to adhere the electrode and the separator to each other.

Figure 4:
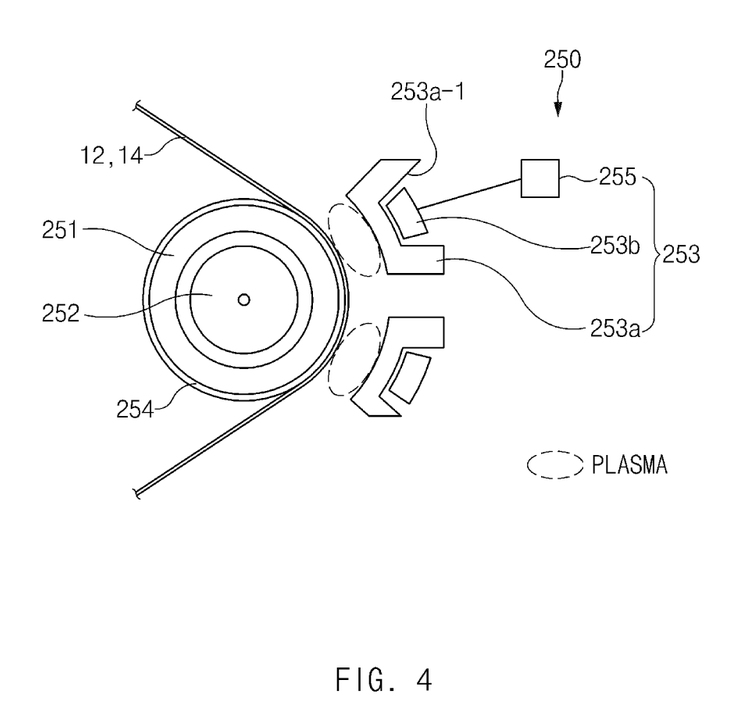
FIG. 4 is a side cross-sectional view of a plasma generating apparatus according to an embodiment of the present invention.
Figure 5:
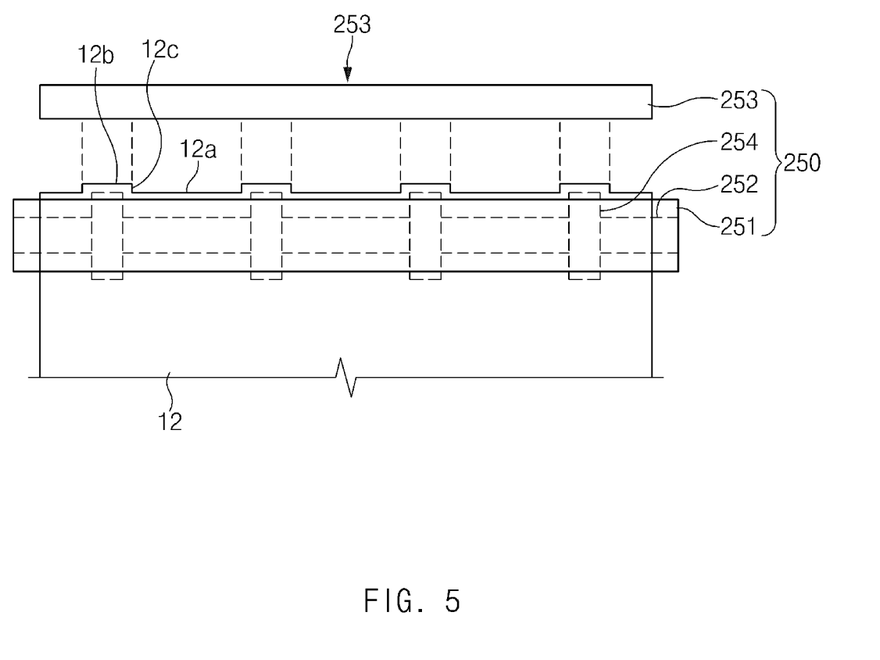
FIG. 5 is a plan view of the plasma generating apparatus according to an embodiment of the present invention.

For example, as illustrated in FIGS. 3 to 5, the plasma generating apparatus 250 comprises a transfer roller 251, a metal member 252, a plasma generating member 253, and a protrusion member 254.

The transfer roller 251 supports one surface of each of the separators 12 and 14 to transfer the separators 12 and 14. To stably irradiate plasma onto the surfaces of the separators 12 and 14 supported on the transfer roller 251, the separators 12 and 14 has to be supported on at least a quarter of the entire circumferential surface of the transfer roller 251.

The metal member 252 is provided within the transfer roller 251.

The plasma generating member 253 is disposed to be spaced apart from the separators 12 and 14 and interacts with the metal member 252 to generate a plasma to be irradiated onto the surfaces of the separators 12 and 14.

For example, as illustrated in FIG. 4, the plasma generating member comprises a main body 253a disposed in a width direction of the separators 12 and 14 and an electrode piece 253b disposed in a longitudinal direction of the main body 253a to generate a plasma between the metal member 252 and the main body 253a and thereby to irradiate the generated plasma onto the surfaces of the separators 12 and 14.

The main body 253a may be made of a non-metallic material. Thus, an occurrence of resistance between the metal member 252 and the electrode piece 253b may be prevented to stably generate the plasma between the metal member 252 and the main body 253a.

The main body 253a may be made of a ceramic among the non-metallic materials. Ceramic is a non-metallic inorganic material obtained through a thermal treatment process and has heat resistance, high strength, and corrosion resistance. Particularly, since the ceramic is lightweight, efficiency of use may be improved.

The electrode piece 253b may be a corona discharge electrode. The plasma may be stably generated between the metal member 252 and the main body 253a by the corona discharge electrode.

The electrode piece 253b may comprise a plurality of unit electrode pieces. The plurality of unit electrode pieces may be connected to each other in the width direction of the separators 12 and 14 on the main body 253a to form one electrode piece 253b. Thus, the unit electrode pieces may be compatibly used on the separators having various widths.

The plurality of unit electrode pieces may be disposed to be spaced apart from each other in the width direction of the separators 12 and 14 on the main body 253a. Thus, the plasma may be partially generated between the metal member 252 and the main body 253a, and thus, the patterned adhesion may be achieved on the surfaces of the separators 12 and 14.

The plurality of electrode pieces may have the same length, width, and thickness or may have lengths, widths, and thicknesses of which at least one is different. Thus, the adhesion having various patterns may be achieved on the surfaces of the separators 12 and 14.

An insertion groove 253a-1 defined lengthwise is formed in the main body 253a along the width direction of the separators 12 and 14. The of electrode piece 253b is inserted to be fixed to the insertion groove 253a-1. Thus, the electrode piece 253b may be prevented from being damaged by an external object, thereby stably generating the plasma.

As illustrated in FIG. 5, in the plasma generating apparatus 253 having the above-described constituents, the metal member 252 and the electrode piece 253b may correspond to each other to generate the plasma. The plasma is irradiated onto the surface surfaces of the separators 12 and 14 between the metal member 252 and the electrode piece 253b to achieve the adhesion on the separators 12 and 14.

The protrusion member 254 is configured to achieve the patterned adhesion on the surfaces of the separators. The protrusion member 254 may form an adhesion area, which is adhesive, from which a portion of each of the separators 12 and 14 closely attached to the transfer roller 251 protrudes and onto which the plasma is irradiated and a non-adhesion area onto which the plasma is not irradiated or is more weakly irradiated than the adhesion area so that there is no adhesion or has an adhesion weaker than the adhesion area. Thus, the patterned adhesion may be achieved on the surfaces of the separators 12 and 14.

Figure 6:
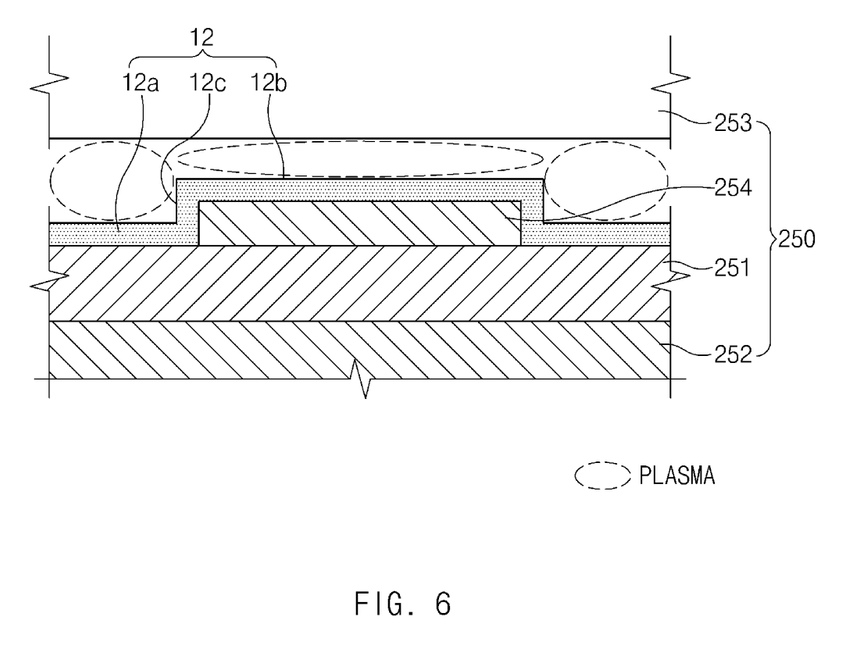
FIG. 6 is a partial enlarged cross-sectional view of the plasma generating apparatus according to an embodiment of the present invention.

For example, as illustrated in FIGS. 5 and 6, the protrusion member 254 is disposed between the transfer roller 251 and the separator 12, and a portion of the separator 12 closely attached to the transfer roller 251 protrudes outward. Thus, the separator 12 has a bottom surface 12a closely attached to the transfer roller 251, a top surface 12b that is protruded by the protrusion member 254, and a connection surface 12c that connects the bottom surface 12a and the top surface 12b. In other words, the separator 12 may provide a protrusion having an uneven shape by connecting the bottom surface 12a, the top surface 12b, and the connection surface 12c to each other.

When the plasma is irradiated onto the surface of the separator 12, the plasma may be irradiated to form the adhesion area having the adhesion on the bottom surface 12a and the top surface 12b, and the non-adhesion area may be formed on the connection surface 12c since the plasma is concentrated onto the top surface 12b instead of the connection surface 12c.

Thus, the protrusion member 254 may provide the adhesion area and the non-adhesion area on the surfaces of the separators 12 and 14 closely attached to the transfer roller 152. As a result, a mask that has the patterned adhesion in which the adhesion area and the non-adhesion area are alternately provided may be formed.

Here, the bottom surface 12a and the top surface 12b may be provided as surfaces parallel to the longitudinal direction of the transfer roller 251. Thus, the plasma may be more stably irradiated onto the bottom surface 12a and the top surface 12b to form the adhesion area. Also, the connection surface 12c may be disposed as a vertical surface perpendicular to the bottom surface 12a and the top surface 12b. Thus, the plasma may not be irradiated onto the connection surface 12c, or although the plasma is irradiated onto the connection surface 12c, the plasma may be minimally irradiated to form the non-adhesion area that is non-adhesive or less adhesive than the adhesion area.

The protrusion member 254 may have a ring shape along a circumferential surface of the transfer roller 251. In other words, the protrusion member 254 may provide protrusions having the same shape on the surfaces of the separators 12 and 14 closely attached to the transfer roller 251, thereby achieving the patterned adhesion having a predetermined size and shape.

At least one or more protrusion members 254 may be provided in the longitudinal direction of the transfer roller 251. Thus, the patterned adhesion having the plurality of non-adhesion areas may be formed on the surfaces of the separators 12 and 14. As a result, an electrolyte may be introduced, or a gas may be discharged through the plurality of non-adhesion areas to significantly improve the electrolyte impregnation and the gas discharge.

The protrusion member 254 having the ring shape may be provided to move or be fixed to the transfer roller 251 in the longitudinal direction of the transfer roller 251. Thus, the non-adhesion areas formed on the surfaces of the separators 12 and 14 may be adjusted in position. As a result, the patterned adhesion provided on the surfaces of the separators 12 and 14 may be uniformly or non-uniformly adjusted.

The protrusion member 254 may be made of the same material as the transfer roller 251. Particularly, the protrusion member 254 may be integrally manufactured when the transfer roller 251 is manufactured. Thus, the manufacturing process may be easy, and the manufacturing costs may be reduced.

In the plasma generating apparatus for the secondary battery, which comprises the above-described constituents, according to an embodiment of the present invention, the adhesion area and the non-adhesion area may be provided on the surface of the separator to form the mask having the patterned adhesion.

Hereinafter, in descriptions of another embodiment of the present invention, constituents having the same constituent and function as the abovementioned embodiment have been given the same reference numeral in the drawings, and thus duplicated description will be omitted.

Referring to FIG. 4, a plasma generating apparatus for a secondary battery according to another embodiment of the present invention may further comprise a switch 255 that applies power to an electrode piece 253b of a plasma generating member 250. The switch 255 may control the power supplied to the electrode piece 253b to easily control the use of the electrode piece 253b, thereby preventing the power from being unnecessarily wasted.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A plasma generating apparatus for a secondary battery, the plasma generating apparatus comprising:
   a transfer roller that transfers a separator;
   a metal member disposed in the transfer roller;
   a plasma generating member that interacts with the metal member to generate a plasma and irradiate the generated plasma onto a surface of the separator; and
   a protrusion member that causes a portion of the separator closely attached to the transfer roller to protrude and forms an adhesion area, which is adhesive, and a non-adhesion area, which is non-adhesive or less adhesive than the adhesion area, by allowing the plasma to be irradiated onto the adhesion area and no plasma or less plasma to be irradiated onto the non-adhesion area,
   wherein the protrusion member has a ring shape around an outer circumferential surface of the transfer roller, and at least one protrusion of the protrusion member is provided in a longitudinal direction of the transfer roller.

2. The plasma generating apparatus of claim 1, wherein the separator has a bottom surface closely attached to the transfer roller, a top surface that is protruded by the protrusion member, and a connection surface that connects the bottom surface and the top surface, and
   the plasma is irradiated onto the bottom surface and the top surface to form the adhesion area that is adhesive and to form the non-adhesion area that is non-adhesive or less adhesive than the adhesion area, on the non-adhesion area corresponding to the connection surface, due to the irradiated plasma being concentrated onto the top surface.

3. The plasma generating apparatus of claim 1, wherein the protrusion member having the ring shape is provided to be moved and fixed to the transfer roller along the longitudinal direction of the transfer roller.

4. The plasma generating apparatus of claim 1, wherein the protrusion member having the ring shape is provided to be integrated with the transfer roller.

5. The plasma generating apparatus of claim 1, wherein the protrusion member is made of a same material as the transfer roller.

6. The plasma generating apparatus of claim 2, wherein the bottom surface and the top surface are provided as surfaces parallel to a longitudinal direction of the transfer roller, and the connection surface is provided as a vertical surface perpendicular to the bottom surface and the top surface.

7. The plasma generating apparatus of claim 1, wherein the plasma generating member comprises:
   a main body disposed in a width direction of the separator; and
   an electrode piece disposed in a longitudinal direction of the main body to generate the plasma between the metal member and the main body and thereby to irradiate the generated plasma onto the surface of the separator.

8. The plasma generating apparatus of claim 7, wherein the plasma generating member further comprises a switch that applies power to the electrode piece to generate the plasma.

9. The plasma generating apparatus of claim 7, wherein the main body is made of a non-metallic material.

10. The plasma generating apparatus of claim 9, wherein the main body is made of a ceramic.

11. The plasma generating apparatus of claim 7, wherein the electrode piece is provided as a corona discharge electrode.

12. The plasma generating apparatus of claim 7, wherein the electrode piece is inserted into an insertion groove provided in an outer surface of the main body.

13. A plasma generating apparatus for a secondary battery, the plasma generating apparatus comprising:
   a transfer roller that transfers a separator;
   a metal member disposed in the transfer roller;
   a plasma generating member that interacts with the metal member to generate a plasma and irradiate the generated plasma onto a surface of the separator; and
   a protrusion member that causes a portion of the separator closely attached to the transfer roller to protrude and forms an adhesion area, which is adhesive, and a non-adhesion area, which is non-adhesive or less adhesive than the adhesion area, by allowing the plasma to be irradiated onto the adhesion area and no plasma or less plasma to be irradiated onto the non-adhesion area,
   wherein the plasma generating member comprises:
   a main body disposed in a width direction of the separator; and
   an electrode piece disposed in a longitudinal direction of the main body to generate the plasma between the metal member and the main body and thereby to irradiate the generated plasma onto the surface of the separator.

14. The plasma generating apparatus of claim 13, wherein the plasma generating member further comprises a switch that applies power to the electrode piece to generate the plasma.

15. The plasma generating apparatus of claim 13, wherein the main body is made of a non-metallic material.

16. The plasma generating apparatus of claim 15, wherein the main body is made of a ceramic.

17. The plasma generating apparatus of claim 13, wherein the electrode piece is provided as a corona discharge electrode.

18. The plasma generating apparatus of claim 13, wherein the electrode piece is inserted into an insertion groove provided in an outer surface of the main body.

* * * * *